July 9, 1957

J. R. CORBETT ET AL 2,798,700

CULINARY MIXER

Filed Feb. 10, 1954

INVENTOR.
Joseph R. Corbett.
Hindol H. Sprague.
BY Wood, Herron & Evans.
ATTORNEYS.

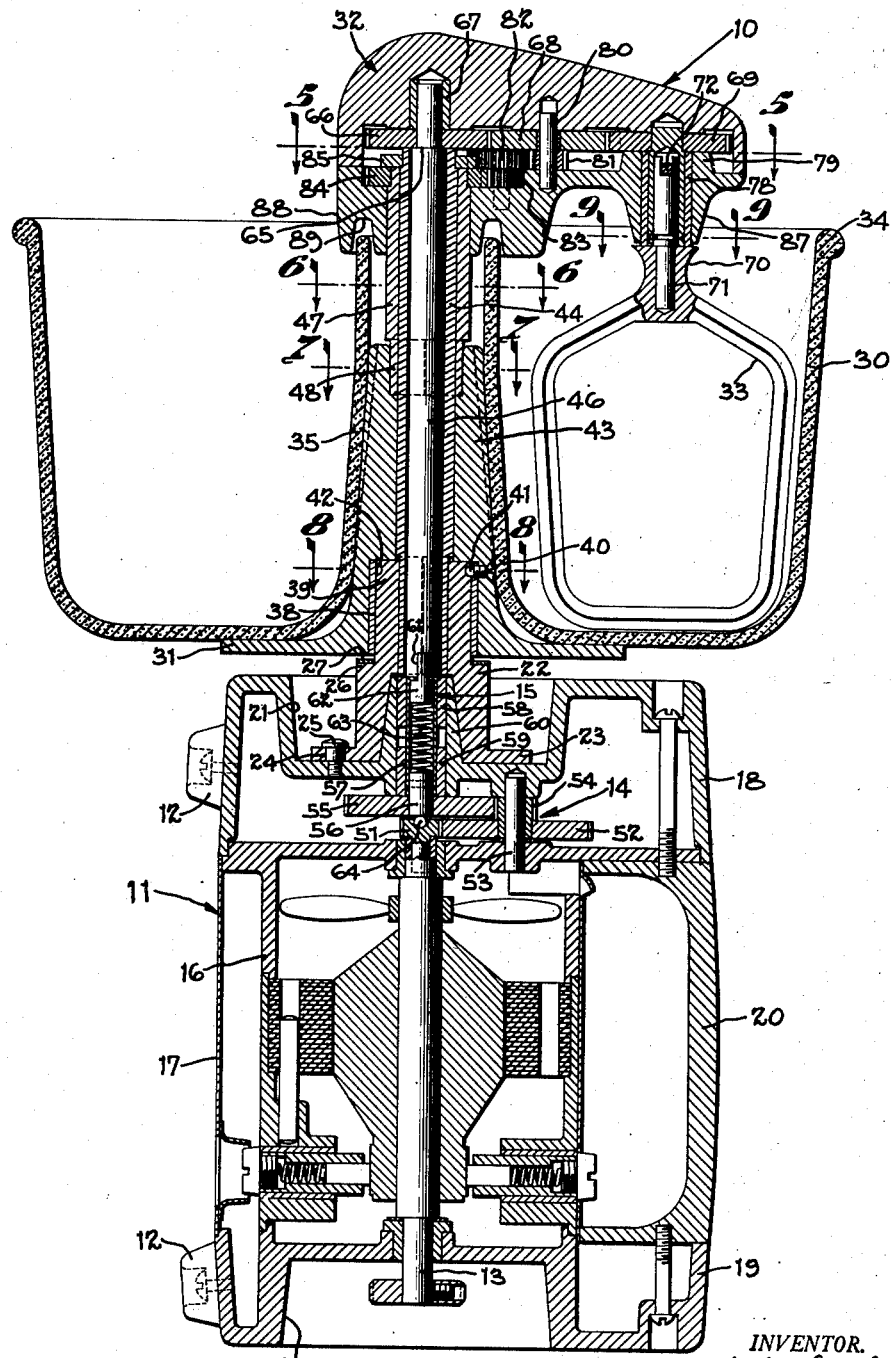

July 9, 1957 J. R. CORBETT ET AL 2,798,700
CULINARY MIXER
Filed Feb. 10, 1954 3 Sheets-Sheet 3

INVENTOR.
Joseph R. Corbett.
BY Lindol H. Sprague.
Wood, Herron & Evans.
ATTORNEYS.

United States Patent Office 2,798,700
Patented July 9, 1957

2,798,700
CULINARY MIXER

Joseph R. Corbett and Lindol H. Sprague, Cincinnati, Ohio, assignors, by direct and mesne assignments, to NuTone, Inc., Cincinnati, Ohio, a corporation of New York Application February 10, 1954, Serial No. 409,371

9 Claims. (Cl. 259—85)

This invention relates to culinary apparatus and particularly to electrically powered mixers which are used in kitchens to prepare foods. More specifically, the present invention is directed to a mixer which is adapted to be used in conjunction with a multi-purpose electric motor unit of the type which is exemplified by the disclosure of our copending application Serial No. 409,372, filed February 10, 1954.

The unit of our copending application consists of an electric motor having a high speed take-off at one end thereof and a slow speed take-off at the other end thereof. The motor is enclosed within a housing which is adapted to serve as the pedestal support for various culinary appliances. When used in conjunction with the mixer of this invention, the motor unit is placed on end with the slow speed take-off up, where it may be coupled with the mixer to drive it.

The mixer comprises a mixing bowl, a turntable to mount the bowl on top of the motor unit, a mixer head, and means to transmit the drive from the motor unit to the turntable and to a paddle member which depends from the mixer head into the bowl. The bowl provided has a centrally disposed hollow tube which rises from the bottom of the bowl and extends substantially to the upper rim thereof. The tube is configurate internally to receive a mandrel which extends upwardly from the center of the turntable. The weight of the bowl is borne by the turntable. However, the tapered mandrel serves to center the bowl on the turntable and to prevent relative turning movement between the two.

The drive shaft for the beater head extends vertically through the center of the mandrel, with provision being made at the lower end of the shaft to couple with the slow speed take-off of the motor unit. The mixer head is supported by a tubular column which surrounds the drive shaft. The column does not rotate, being socketed at its lower end in a stand which is adapted to be attached to the housing of the motor unit. The mixer head extends radially from the upper end of the tubular column and encloses a gear train which transmits the drive from the vertically disposed shaft to the paddle member and to the turntable. The gear train provided is such that the turntable is rotated in one direction, counter-clockwise for example, whereas the paddle member is rotated in the opposite direction. The paddle member depends from the mixer head into one side of the bowl and is so shaped that the figure which is generated upon the rotation of the paddle substantially complements the internal shape of the bowl between the central tube and the outer wall thereof. The advantage of this relationship is that each particle of the ingredients being mixed in the bowl must pass through the rotating paddle member. Thus, it is unnecessary for the operator to use a spatula or other utensil to push the ingredients into the path of the paddle member; which practice has proven to be a hazard in past mixer constructions because of the likelihood of such utensils becoming caught in the paddle or beater blades.

The positive drive and counter-rotation of the mixing bowl relative to the paddle member provided in the present mixer results in better and speedier mixes. In those mixer devices where the bowls are mounted so that they may turn freely, the action of the turning paddles on the mix is relied upon to cause the bowl to rotate. Thus, a substantial percentage of the energy expended by the paddles on the mix is used to induce bowl rotation. If the present bowl were permitted to rotate freely, the paddle action would cause the bowl to rotate in the same direction that the paddle is driven. However, by driving the bowl positively and in the direction opposite to paddle rotation all paddle action is used for mixing purposes. The result is that mixing proceeds faster and is more thorough.

Other features and advantages of the present invention will be apparent to those skilled in the art from the following detailed description of the drawings in which:

Figure 3 is a cross sectional view taken through the vertical axis of the motor unit and mixer appliance illustrated in Figure 1 showing the appliance in place on the unit.

Figure 1:
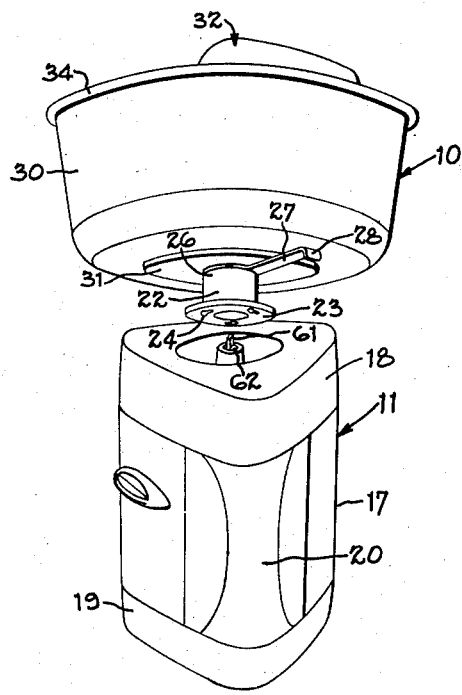
Figure 1 is a perspective view of a mixer appliance and a motor unit illustrating the manner in which the mixer is adapted to be seated on top of the unit.
Figure 4:
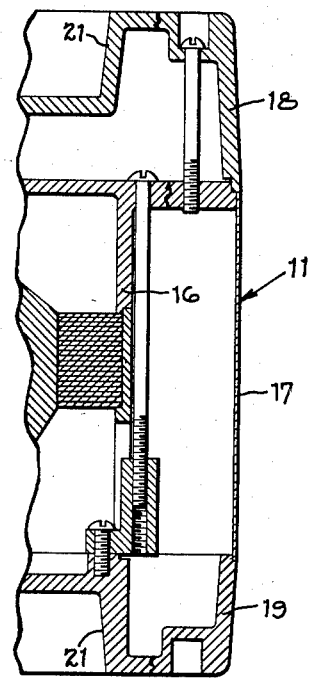
Figure 4 is a fragmentary cross sectional view through the one side of the motor unit taken on the line 4—4 in Figure 2.

In the drawings, the numerals 10 and 11 are used to designate respectively a mixer and an electric motor unit for driving the mixer. The motor unit 11 is also disclosed in our copending patent application referred to previously. The application is concerned primarily with the construction of the housing which is generally triangular in cross section with flat ends. The construction permits the motor unit to be used in any one of three positions for driving a variety of appliances. It may be laid on its side to rest upon rubber pads such as those shown at 12, or it may be stood upright on one end or on the opposite end. The motor which is enclosed within the housing has a directly driven high speed shaft 13 extending from one end, a speed reducing gear train 14 at the other end, and a slow speed coupler, indicated generally at 15, which is driven from the reduction gearing in coaxial alignment with the high speed shaft. The shaft and coupler extend from the respective opposite ends of the housing and constitute respectively high speed and slow speed take-off means.

In the present combination, the unit is placed, as shown in Figure 1, with the slow speed take-off end up. In this position the housing serves as a pedestal to mount the mixer 10 and the slow speed take-off serves to drive the mixer. It will be obvious, therefore, that the mixer may be used in conjunction with power units other than the particular one shown so long as such units are capable of performing these two functions.

The unit 11 does, however, have numerous advantages when used in conjunction with the mixer 10. The motor is mounted within a rugged, cast body 16 which is enclosed within a casing 17. Upper and lower end bells 18 and 19 respectively are rigidly secured to the body casting 16. The upper end bell provides a convenient means for securely attaching the mixer, whereas end bell 19 provides a broad, stable base for the combination. One side edge of casing 17 is flat and a handle 20 inserted between the respective end bells provides a means to manipulate the unit easily.

Figure 2:
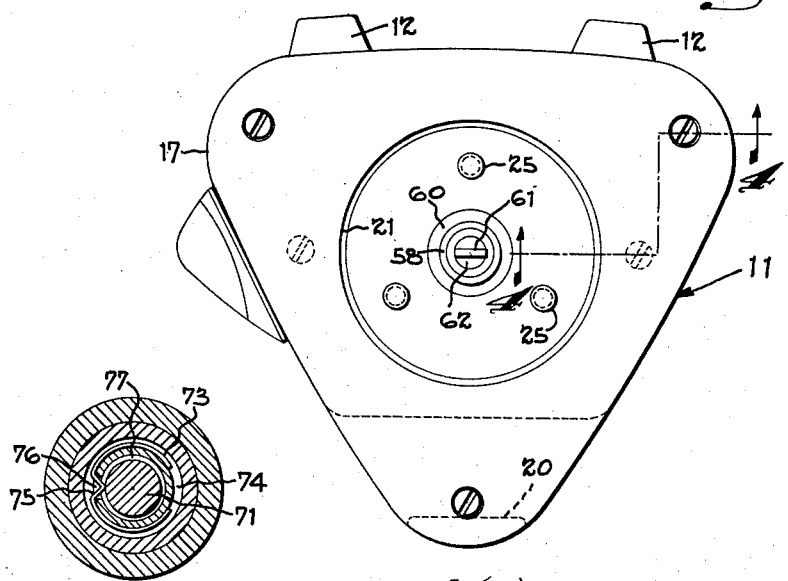
Figure 2 is a top plan view of the motor unit shown in Figure 1.

Both of the end bells are recessed as at 21 around the power take-off means at the respective ends of the motor. In the present combination, the recess which is in the upper end bell 18 of the motor housing receives a stand 22 which is used to mount the mixer on the housing. The stand includes a flat annular flange 23 at the bottom thereof. Three keyhole slots 24 are provided in flange 23 at symmetrically spaced points. These slots are designed to receive bayonet pins 25, each of which has a threaded shank by means of which it is securely attached to the end bell 18 within the recess. The lower portion of the stand which is adapted to reside within recess 21 is cylindrical and terminates at a shoulder 26 which is slightly above the upper face of end bell 18 when the stand is attached to the unit. Shoulder 26 receives the circular head of a lever 27 which is rigidly affixed to the stand by means such as rivets, welding or other known expedients. The purpose of this lever, as will be seen from Figure 1, is to provide a means to manipulate the stand in order to engage the bayonet pins 25 in slots 24, and thereby secure the mixer to the power unit. As will be seen in Figure 2, the unit is symmetrically triangular in cross section and the bayonet pins are so related to the three side faces thereof that the pins will be aligned with the slots when the lever is extending radially outwardly from the stand above the center of any one of the side faces of the housing. To further assist in aligning the pins and slots the lever is of such a length that a tang 28 turned down at the outer end thereof strikes the upper surface of end bell 18 at any one of the three corners thereof if an attempt is made to seat the mixer improperly.

Figure 8:
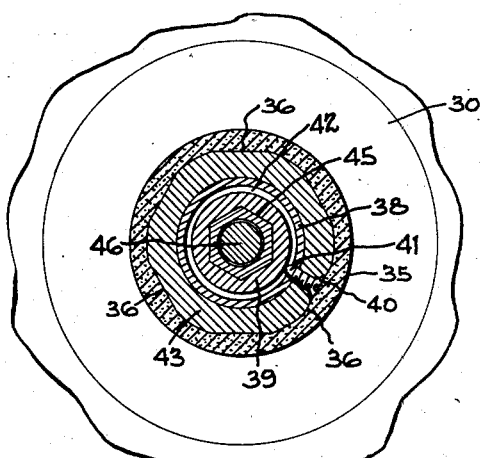
Figure 8 is a fragmentary cross sectional view taken on the line 8—8 of Figure 3.

In general the mixer consists of a mixing bowl 30, a turntable 31, a mixer head 32, and a paddle member 33. The bowl may be made of glass; however, plastic is preferred because there is less likelihood of breakage. A bead 34 is provided on the rim of the bowl and a hollow tube 35 rises from the bottom of the bowl in the center thereof to terminate just below the level of the rim bead. The center tube is formed as an integral part of the bowl. As shown in Figure 3 substantial radii are provided in the two annular areas of the bowl where the tube and the side wall join the bottom. The lower portion of the tube 35 has a slight upward taper and the inner surface of the tube within this area is configurated to provide a plurality of flat faces 36 of the type shown in Figure 8, the purpose of which will be explained below.

The bowl is supported by the turntable 31. The underside of the turntable, at the center thereof, has a substantially large cylindrical bore therein in which a bushing 38 is seated. A cylindrically shaped pedestal 39 which extends upwardly from the shoulder 26 in the center of the stand 22 is rotatably journalled within bushing 38. The turntable is affixed to the stand by means of a radially disposed countersunk metal screw 40 which traverses the turntable and bushing and which has a rounded inner end 41 adapted to ride in a groove 42 which extends around the pedestal adjacent to the upper end thereof. By virtue of this construction the turntable is free to rotate with respect to the stand, but the two cannot be separated.

A tapered mandrel 43 rises from the center of turntable 31. The mandrel has a plurality of flat faces on it which complement the flat faces 36 on the inner surface of the central tube 35 of the bowl, so that the bowl and turntable are thereby keyed together. The fit between the respective sets of flat faces is a loose one, however, so that all of the weight of the bowl is borne by the turntable and none absorbed by the mandrel to cause it to jam inside of tube 35.

The mixer head 32 is supported by means of a hollow cylindrical column 44. The column extends through an appropriate bore which passes vertically through the central axis of the mandrel 43. The lower end of the column is removably socketed in the pedestal portion of the stand. The portion of the column, which makes contact with the pedestal, is hexagonal in shape as indicated at 45 in Figure 8. A hexagonally shaped bore is also provided in the center of the pedestal to receive the end 45 of the column in slip-fit relationship.

The column encloses a drive shaft 46 which extends up through it to the mixer head 32, where, through a gear train to be described in detail at a later point, it drives the mixer paddle 33. In addition to this, the gear train also drives a sleeve 47 which surrounds the upper portion of the column 44 and which extends downwardly from the mixer head to the mandrel. The lower portion 48 of the sleeve 47 is hexagonal and is adapted to fit within a hexagonal socket 49 which is provided in the mandrel around the column. The sleeve 47 constitutes the means for connecting the drive from the gear train to the turntable.

The sleeve 47, the hollow column 44 and the drive shaft 46 are permanently attached to the mixer head 32. The hexagonal socket connections between the sleeve 47 and the mandrel 43, and between the lower end of the column and the pedestal, are sufficiently loose to permit the mixer head to be withdrawn upwardly and detached from the rest of the unit.

The driving connection between the lower end of shaft 46 and the slow speed take-off of the motor unit is established by means of the coupler which is indicated generally by the numeral 15. The coupler is spring loaded and is in driving connection with the shaft of the motor through the speed reduction means which is indicated generally at 14. The gears in means 14 include a pinion 51 which is affixed in an axial bore at the upper end of the motor shaft. Pinion 51 meshes with a large gear 52 which is rotatably journalled upon shaft 53 mounted vertically at one side of the motor shaft. Also journalled on the shaft 53 is a second small gear or pinion 54 which is welded directly to gear 52 and which is meshed with a second large gear 55. The latter gear is securely attached to a stub shaft 56 which is disposed in axial alignment with the motor drive shaft. Stub shaft 56 is secured, by means of a cross pin, inside of a tube 57 which is rotatably journalled in upper and lower sleeve bearings 58 and 59. These bearings are seated within a boss 60 which is formed as an integral part of end bell 18. As shown, the outer wall of boss 60 tapers upwardly and provides a self-centering seat for the stand 22 which has a tapered bore in it complementing the shape of the outside of boss 60. The tube 57 is closed at its upper end with the exception of a diametrically disposed slot, which slot accommodates a blade 61 extending upwardly from a cylindrical plug 62 which is slidably mounted inside of tube 57. A coil spring 63 inside of the tube 57, which is seated at its lower end against stub shaft 56 urges the plug 62 upwardly. A cross slot in the lower end of drive shaft 46 is provided to receive the blade 61 of the slow speed coupler assembly. Thus, when the mixer head is being attached to the stand the spring insures that the blade 61 will be properly seated in the slot at the lower end of the drive shaft, because if the blade and slot are not lined up initially, they become aligned in the first half of a revolution of the coupler. The spring pressure exerted downwardly on the stub shaft 56 is borne by a thrust bearing 64 which consists of a steel ball embedded in the upper surface of the pinion 51 in alignment with the axis of rotation of the motor shaft and the stub shaft 56.

Figure 9:
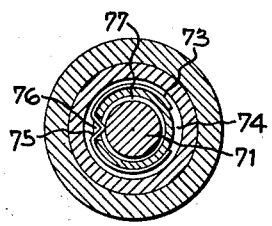
Figure 9 is a fragmentary cross sectional view taken on the line 9—9 of Figure 3.
Figure 5:
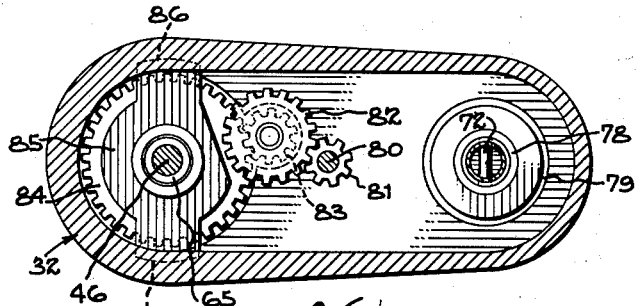
Figure 5 is a fragmentary cross sectional view taken on the line 5—5 in Figure 3 illustrating a part of the gear train which is mounted in the mixer head.
Figure 6:
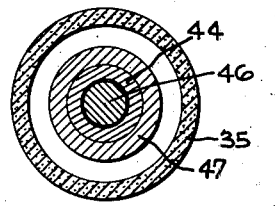
Figure 6 is a fragmentary cross sectional view taken on the line 6—6 in Figure 3.
Figure 7:
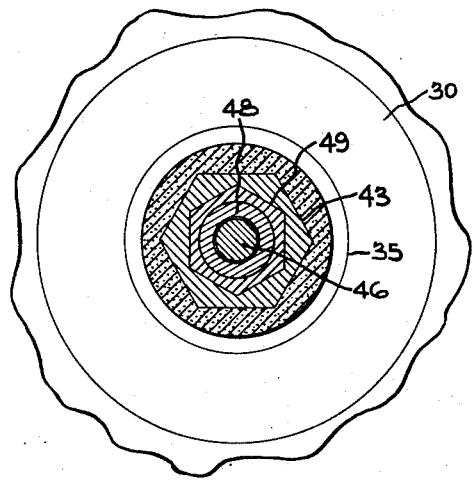
Figure 7 is a fragmentary cross sectional view taken on the line 7—7 of Figure 3.

Mixer head 32 consists of two cast shells which are joined together on a line which extends around the head in a horizontal plane, the two shells being fastened together by bolts (not shown). The mating surfaces of the respective shells are configured to accommodate the elements of the gear train which transmit the drive from shaft 46 to the paddle member 33 and to the turntable 31. The upper end of the drive shaft 46 is of reduced diameter providing a shoulder 65 at the upper end of the tubular column 44. The end of shaft 46 above the shoulder 65 mounts a gear 66 which may be sweat soldered or otherwise securely affixed to it. Above gear 66 the shaft is rotatably journalled in a bushing 67 which may be press fitted into an appropriate bore in the upper shell of the mixer head. Gear 66 meshes with an idler gear 68, and the latter gear meshes with a third gear 69. Gear 69 is in direct driving relation with a chuck 70 which is designed to receive a spindle 71 of the paddle member 33. The upper portion of the chuck consists of a stub shaft which may be sweat soldered directly to the gear 69. The lower portion has an axial bore therein to receive the spindle 71. A cross pin 72 in the upper portion of the chuck is provided to seat within a cross slot in the upper end of the spindle to key the socket to the spindle. A spring detent 73 which is shown in detail in Figure 9 is provided to hold the spindle in the chuck. The detent consists of a wire snap-ring which fits in a circumferential groove 74 formed in the outer wall of the chuck adjacent to its lower end. At one side thereof the spring has a V-shaped portion 75 which traverses a slot 76 in the side of the chuck and extends into a circular groove 77 formed in spindle 71. The inner end of the V-shaped portion 75 of the spring may be cammed out of groove 77 to free the spindle by pulling downwardly on the paddle member 33. The same action takes place upon the insertion of the spindle.

The chuck 70 is rotatably journalled in a sleeve bearing 78 which may be press fitted into an appropriate bore in the lower shell of the mixer head. An annular band 79 formed in the shell concentric with the bore in which sleeve bearing 78 is seated contacts the underside of the gear 69 to hold the chuck assembly in place within the mixer head.

The gear 68 idles on a stub shaft 80 which has its upper and lower ends seated in appropriate bores formed in the two parts of the mixer head. Gear 68 is securely fastened to a small gear or pinion 81 which is at its underside. Gear 81 is in turn meshed with a gear 82 which also has a small gear 83 rigidly secured to it at its underside. The latter gear meshes with a gear 84 which is attached to the upper end of the drive sleeve 47, the lower end of which is socketed in the mandrel 43.

Figure 10:
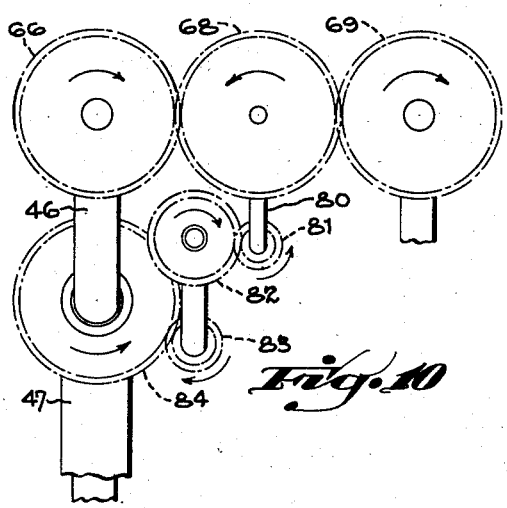
Figure 10 is a diagrammatic view illustrating the gear train which is used to drive the mixer paddle and the turntable.
Figure 11:
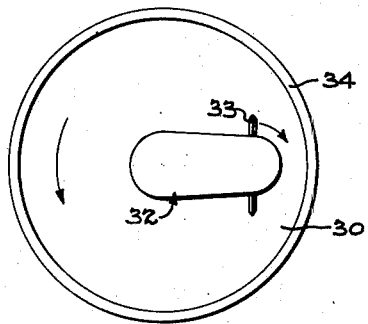
Figure 11 is a top plan view of the mixer.

As will be seen from the diagrammatic view of Figure 10, the drive from shaft 46 progresses through gears 66, 68 and 69 to the paddle member. The drive to the mandrel and the turntable proceeds through gears 66, 68, 81, 82, 83, 84 and the drive sleeve 47. In this train of gears, it will be noted that gear 66 is driven in one direction, which is the direction of rotation of the paddle member, whereas gear 84 is driven in the opposite direction, which has the direction of rotation of the turntable. The tubular column 47 remains stationary, however, being keyed to the stand 22. The upper end of the column has a cross key 85 securely attached to it by sweat solder or other known means. The opposite ends of the cross key are received in notches 86—86 formed in the upper shell of the mixer head at the two sides of the column. The key therefore, prevents the rotation of the mixer head, inasmuch as it is fixed relative to the stand by means of the column 44 which is stationary.

The lower shell of the mixer head 32 includes a depending boss 87, which encloses chuck 70, and a depending boss 88, of substantially larger size than boss 87, which surrounds the upper end of sleeve 47. The lower face or underside of boss 88 has an annular groove 89 in it to receive the upper end of the hollow tube 35 which is in the center of the mixing bowl. The lower portion of boss 88 to the outside of groove 89, therefore, constitutes a skirt which surrounds the upper end of the hollow tube to prevent ingredients being mixed from spilling or splashing into the inside of the tube.

As will be seen from the above description, the mixer appliance comprises three major parts: the turntable and stand, which are fastened together by the metal screw 40; the mixer head, including the sleeve 47, the cylindrical column 44, and the drive shaft 46 which is enclosed within the column; and the mixing bowl. Disassembly of the major parts of the mixer is simply a matter of lifting the mixer head to disengage it from the stand. With the mixer head removed, the bowl may be lifted upwardly off of the turntable.

In use, the weight of the parts of the mixer and the ingredients being mixed is centered upon the motor unit. The only off center weight is that of the outer end of the mixing head and the paddle. It will be seen, therefore, that the combination of the mixer and the motor unit will rest solidly and safely upon a supporting surface.

Having described our invention, we claim:

1. A mixer appliance adapted to be mounted on top of a motor unit, said appliance comprising a stand adapted to be secured to said motor unit, a turntable mounted upon said stand for rotation about a vertical axis, a mandrel rising from the center of said turntable, said mandrel tapering upwardly, a mixing bowl adapted to be seated upon said turntable, said mixing bowl having a hollow tube in the center thereof which rises substantially to the level of the rim of said bowl, said tube being configurated internally to engage said mandrel in keyed relationship, a hollow cylindrical column removably socketed in said stand and extending upwardly therefrom through said mandrel in axial alignment with the axis of rotation of said turntable, a mixer head mounted upon the upper end of said column and extending radially therefrom, a drive shaft enclosed within said hollow column, means to couple the lower end of said drive shaft to said motor unit, a mixing paddle adapted to be received in said mixer head and depend therefrom into the mixing bowl on the turntable, gear means housed within said mixer head and connecting said drive shaft to said mixing paddle, a sleeve rotatably journalled in said mixer head and depending therefrom surrounding said hollow column, the lower end of said sleeve being removably socketed in said mandrel in keyed, driving relationship therewith, additional gear means connecting the first mentioned gear means to said sleeve, the respective gear means being arranged to drive the sleeve, and thereby the mandrel of the turntable, in one direction while driving the mixing paddle in the opposite direction, and said paddle being configurated to generate a figure upon the rotation thereof which substantially fills the space in the bowl between the central tube, the bottom and the outer wall thereof, whereby ingredients to be mixed placed in the rotation bowl must travel in a depth which passes through said figure generated by the rotating mixing paddle.

2. A mixer appliance adapted to be mounted upon a motor unit, said appliance comprising a stand adapted to be secured to said motor unit, a turntable mounted upon said stand for rotation about a vertical axis, a mandrel rising from the center of said turntable, a mixing bowl adapted to be seated upon said turntable, said mixing bowl having a vertically disposed tube in the center thereof which rises substantially to the level of the rim of said bowl, said tube being configurated internally to engage said mandrel in keyed, driving relationship, a hollow cylindrical column removably socketed in said stand and extending upwardly therefrom through said mandrel in axial alignment with the axis of rotation of said turntable, a mixer head mounted at the upper end of said column and extending radially therefrom, a drive shaft enclosed within said hollow column, means to couple the lower end of said drive shaft to said motor unit, a mixing paddle adapted to be received in said mixer head and depend therefrom into the mixing bowl on the turntable, gear means housed within said mixer head and connecting the upper end of said drive shaft to said mixing paddle, a sleeve rotatably journalled in said mixer head and depending therefrom surrounding said hollow column, the lower end of said sleeve being removably socketed in said mandrel in keyed, driving relationship therewith, and additional gear means connecting the first mentioned gear means to said sleeve, the respective gear means being arranged to drive the sleeve and thereby the mandrel, in one direction while driving the mixing paddle in the opposite direction.

3. A mixer appliance adapted to be mounted upon a motor unit, said appliance comprising a stand adapted to be secured to said motor unit, a turntable rotatably mounted upon said stand, a mixing bowl adapted to be seated upon said turntable, said mixing bowl having a tube in the center thereof which rises substantially to the level of the rim of said bowl, a mandrel rising from the center of said turntable, said tube being configured internally to seat upon said mandrel in keyed, driving relationship therewith with the weight of the bowl borne by the turntable, a hollow cylindrical column removably socketed in said stand and extending upwardly therefrom through said mandrel in axial alignment with the axis of rotation of said turntable, a mixer head mounted at the upper end of said column and extending radially therefrom, a drive shaft enclosed within said hollow column, means to couple the lower end of said drive shaft to said motor unit, a mixing paddle adapted to be received in said mixer head and depend therefrom into the mixing bowl on the turntable, and means connecting the upper end of said drive shaft to said mixing paddle and to said mandrel for driving said paddle in one direction and for driving the mandrel, and thereby the mixing bowl, in the opposite direction.

4. A mixer appliance adapted to be mounted upon a motor unit, said appliance comprising a stand adapted to be secured to said motor unit, a turntable rotatably mounted upon said stand, a mandrel rising from the center of said turntable, a mixing bowl, said mixing bowl having a hollow tube in the center thereof which rises substantially to the level of the rim of said bowl, said tube being configured internally to engage said mandrel in driving relationship therewith, a mixer head, means to mount said mixer head to overhang one side of said mixing bowl on the turntable, said means being mounted in said stand and extending upwardly through the vertical axis of the turntable and mandrel, a mixing paddle adapted to be received in the mixer head and depend therefrom into the mixing bowl on the turntable, means to connect the drive of the motor unit to said mixing paddle and to said mandrel, and said paddle being configurated to generate a figure which substantially fills the space in the bowl at one side between the tube and side wall thereof, whereby ingredients placed in the bowl on the turntable must move in a path which passes through said figure upon the activation of said motor unit.

5. A mixer appliance adapted to be used in conjunction with a motor unit, said appliance comprising a stand adapted to be removably attached to said motor unit, a turntable rotatably fastened to said stand for rotation about a vertical axis, a mixing bowl adapted to be seated upon said turntable, said mixing bowl having a hollow tube in the center thereof which rises substantially to the level of the rim of said bowl, a mandrel rising from the center of said turntable and engageable with the inside of said tube in driving relationship therewith, a mixer head, means to mount said mixer head so as to overhang one side of the mixing bowl upon the turntable, said means extending from said stand through the vertical axis of the mandrel, a mixing paddle, said mixer head adapted to removably receive said mixing paddle so that said paddle depends therefrom into the bowl at a side thereof, means connecting the drive of the motor unit to said mixing paddle for rotating said paddle in one direction, means connecting the drive of the motor unit to the mandrel for rotating the mixing bowl in a direction opposite to the direction of the rotation of said mixing paddle, and said mixing paddle being configurated to generate a figure which substantially fills the side of the bowl into which the paddle depends, whereby ingredients to be mixed placed in the rotating bowl must move through said figure.

6. A mixer appliance adapted to be mounted upon a motor unit, said appliance comprising a stand adapted to be removably fastened to said motor unit, a turntable mounted upon said stand for rotation about a vertical axis, a mixing bowl adapted to be seated upon said turntable, said mixing bowl having a hollow tube in the center thereof which rises substantially to the level of the rim of said bowl, a mandrel rising from the center of said turntable, said mandrel adapted to engage the inside of said tube in driving relationship therewith for rotating said bowl, a hollow cylindrical column removably socketed in said stand and extending upwardly therefrom through said mandrel in axial alignment with the axis of rotation of said turntable, a mixer head mounted upon said column to overhang one side of said bowl on the turntable, a drive shaft enclosed within said hollow column, means to couple the lower end of said drive shaft to said motor unit, a mixing paddle adapted to be received in said mixer head and depend therefrom into the mixing bowl on the turntable, a sleeve rotatably journalled in said mixer head and depending therefrom surrounding said hollow column, the lower end of said sleeve being removably socketed in said mandrel in keyed, driving relationship therewith, a gear train housed within said mixer head, said gear train connecting the upper end of said drive shaft to the mixing paddle for driving the same and to said sleeve for driving the mixing bowl through said mandrel, and said mixing paddle being configurated to generate a figure upon the rotation thereof which substantially fills the space in the bowl at one side thereof between the central tube and the outer wall of the bowl, whereby ingredients to be mixed placed in the rotating bowl must travel in a path which passes through the figure generated by the rotating mixing paddle.

7. A mixer appliance adapted to be mounted upon a motor unit, said appliance comprising a stand adapted to be removably attached to said motor unit, a turntable mounted upon said stand for rotation about a vertical axis, a mixing bowl adapted to be seated upon said turntable, said mixing bowl having a hollow tube in the center thereof which rises substantially to the level of the rim of said bowl, a mandrel rising from the center of said turntable, said mandrel adapted to engage the inside of said tube in driving relationship therewith for rotating the bowl, a hollow cylindrical column removably socketed in said stand and extending upwardly therefrom through said mandrel in axial alignment with the axis of rotation of said turntable, a mixer head mounted upon said column to overhang one side of said bowl on the turntable, a drive shaft rotatably journalled in said mixer head and depending therefrom through said hollow column to said stand, said stand being hollow and configured internally to accommodate means to removably couple the lower end of said drive shaft to said motor unit, a mixing paddle adapted to be received in said mixer head and depend therefrom into one side of the mixing bowl on the turntable, a sleeve rotatably journalled in the mixer head surrounding said hollow column, and depending therefrom, the lower end of said sleeve being removably socketed in said mandrel in keyed, driving relationship therewith, a gear train housing within said mixer head, said gear train connecting the upper end of said drive shaft to the mixing paddle for rotating said paddle in one direction and said gear train also connecting said drive shaft to said sleeve for driving the mixing bowl through said mandrel in a direction which is opposite to the direction of rotation of said mixing paddle.

8. A mixer appliance adapted to be used in conjunction with a motor unit, said appliance comprising a stand adapted to be removably attached to said motor unit, a turntable rotatably journalled upon said stand for rotation about a vertical axis, a mandrel formed as an integral part of said turntable and rising vertically from the center thereof, a mixing bowl having a hollow tube which is formed as an integral part thereof and which rises from the center of the bottom of the bowl extending substantially to the level of the rim of the bowl, said mixing bowl adapted to be seated upon said turntable with the mandrel engaged inside of the hollow tube, means at the inside of the hollow tube keying the bowl to the mandrel for rotation therewith, a mixer head, means to mount said mixer head above the mandrel in fixed relationship relative to the stand so as to overhang one side of the bowl on the turntable, a mixing paddle adapted to be received into said mixer head and depend therefrom into one side of said mixing bowl, and means connecting the drive of the motor unit to said mixer head for driving said mixing paddle, said means also connecting the drive of the motor unit to the mandrel for rotating the turntable and the mixing bowl thereon.

9. A mixer appliance adapted to be mounted upon a motor unit, said appliance comprising a stand adapted to be removably attached to said motor unit, a turntable mounted upon said stand for rotation about a vertical axis, a hollow mandrel rising from the center of said turntable, a mixing bowl having a hollow tube in the center thereof configurated internally to fit over the mandrel in driving relationship therewith, a mixer head, means keyed to the stand and extending upwardly therefrom through said hollow mandrel, the latter named means mounting said mixer head so as to overhang one side of the mixing bowl on the turntable, a mixing paddle, said mixer head adapted to receive said mixing paddle so that said mixing paddle depends from the head into the bowl at a side thereof, means connecting the drive of the motor unit to said mixing paddle for rotating the paddle in one direction, and means connecting the drive of the motor unit to the mandrel for rotating the mixing bowl in the direction opposite to the direction of the rotation of said mixing paddle.

References Cited in the file of this patent

UNITED STATES PATENTS

| | | |
|---|---|---|
| 959,420 | Ashby | May 24, 1910 |
| 1,365,529 | Monroe | Jan. 11, 1921 |
| 1,588,333 | Purner | June 8, 1926 |
| 2,063,692 | Martinet | Dec. 8, 1936 |
| 2,519,543 | Carpegiani | Aug. 22, 1950 |
| 2,605,086 | Marco | July 29, 1952 |